(No Model.)

R. OSTERHORN.
PULLEY.

No. 359,938. Patented Mar. 22, 1887.

Witnesses
H. S. Knight
Edward Steer

Inventor
Robert Osterhorn
By his Attorneys
Knight Bros

UNITED STATES PATENT OFFICE.

ROBERT OSTERHORN, OF ST. LOUIS, MISSOURI.

PULLEY.

SPECIFICATION forming part of Letters Patent No. 359,938, dated March 22, 1887.

Application filed April 20, 1886. Serial No. 199,566. (No model.)

*To all whom it may concern:*

Be it known that I, ROBERT OSTERHORN, a citizen of the United States, residing at the city of St. Louis, in the State of Missouri, have invented a certain new and useful Improvement in Pulleys and Band-Wheels, of which the following is a full, clear, and exact description, reference being had to the accompanying drawings, forming part of this specification, and in which—

Figure 1:
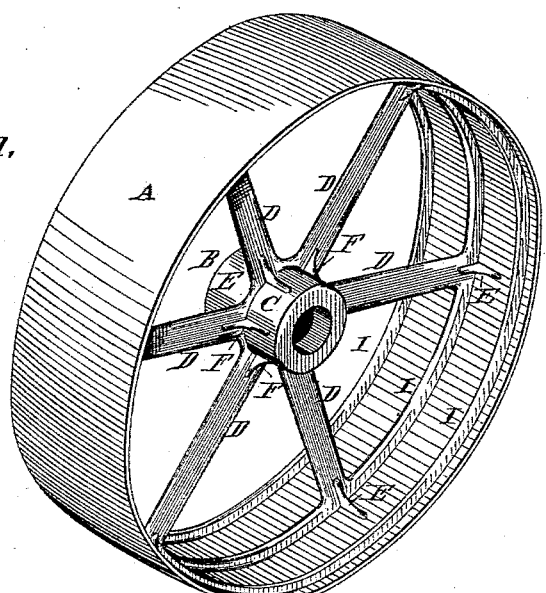
Figure 2:
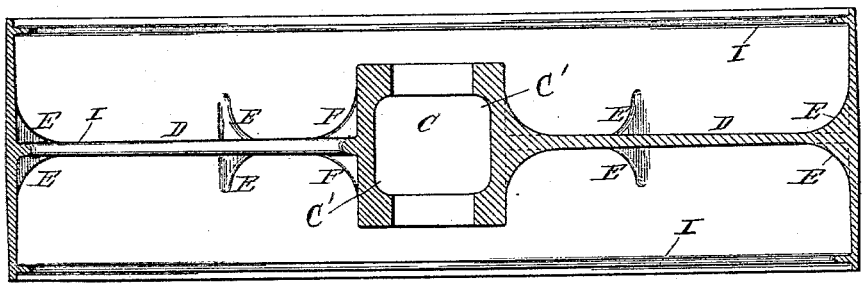

Figure 1 is a perspective view of my improved pulley. Fig. 2 is a transverse section taken through one of the arms of the spider.

My invention relates to an improvement in cast-iron belt-pulleys; and my invention consist in features of novelty hereinafter fully described, and pointed out in the claim.

Referring to the drawings, A represents the rim of the pulley, and B the spider, consisting of the hub C and arms D. The hub, rim, and arms are cast in one piece, the arms and rim being strengthened where the former join the latter by triangular brackets E, cast integral with the arms and rim, and the arms are likewise strengthened where they unite with the hub by means of similar brackets, F, cast integral with the arms and hub, as shown. The object of these brackets is to add strength to the pulley, and by the use of these brackets the hub, arms, and rim (particularly the hub and arms) can be made much lighter and produce a pulley of the same or greater strength than would be produced in the absence of the brackets, thus avoiding a great objection to cast-iron pulleys—that of weight.

In addition to the brackets, I strengthen the rim of the pulley by one or more ribs or flanges, I, surrounding the rim of the pulley on its inner face. I have shown three of these ribs in Fig. 1. I have shown one flange or rib in the center and one near each edge of the pulley; but I do not confine myself to any particular number. The outer ribs, however, are not placed exactly at the outer edges of the pulley, but are placed a short distance back, where they will give the most strength to the rim.

With the brackets E and the ribs or flanges I, I am able to produce very strong and light cast-iron pulleys.

The hub C of the pulley is provided with an enlargement, C', in the eye, which is common in cast-iron pulleys, but which also presents a weak point in the pulley, as the hub is liable to be broken at the thin part caused by this enlargement of the eye. With my improved pulley the hub is not weakened by this enlargement of the eye, for the reason that the brackets F, extending from the arms to the part of the hub beyond the enlargement, as shown in Fig. 2, unite the arms with the part of the hub beyond the enlargement, adding strength to the hub, as stated.

I claim as my invention—

The improved article herein shown and described, consisting of a pulley or band-wheel composed of a hub, arms, and rim cast in one piece, the hub having an eye, the latter having an enlargement within the hub, and brackets extending from the inner ends of the arms to the thick parts of the hub, substantially as set forth.

ROBERT OSTERHORN.

Witnesses:
G. H. TEN BROEK,
A. H. ENGEL.